United States Patent [19]

Okumura et al.

[11] Patent Number: 4,703,167
[45] Date of Patent: Oct. 27, 1987

[54] STAR SCANNER WITH SEMICONDUCTOR PHOTOSENSITIVE ELEMENTS HAVING RETICLES

[75] Inventors: Eisuke Okumura; Katsuhiko Tsuno, both of Yokohama, Japan

[73] Assignee: Kabushiki Kaisha Toshiba, Kawasaki, Japan

[21] Appl. No.: 903,764

[22] Filed: Sep. 5, 1986

[30] Foreign Application Priority Data

Sep. 11, 1985 [JP] Japan .................................. 60-200860

[51] Int. Cl.⁴ ........................ G01J 1/20; G01B 11/26
[52] U.S. Cl. .................................. 250/203 R; 356/141
[58] Field of Search ........................ 250/203 R, 203 S; 244/3.16, 3.17; 356/141, 152

[56] References Cited

U.S. PATENT DOCUMENTS

| | | | |
|---|---|---|---|
| 3,515,594 | 6/1970 | Samuels | 250/203 S |
| 3,614,239 | 10/1971 | Kissell | 250/203 R |
| 3,739,175 | 6/1973 | Mabee et al. | 250/203 R |
| 3,827,807 | 8/1974 | Fletcher | 250/203 R |
| 4,092,072 | 5/1978 | Ellis | 250/203 R |
| 4,627,724 | 12/1986 | Cameron | 356/152 |

Primary Examiner—David C. Nelms
Assistant Examiner—S. Allen
Attorney, Agent, or Firm—Oblon, Fisher, Spivak, McClelland, & Maier

[57] ABSTRACT

A star scanner according to this invention has an optical system for forming a star image, a photoelectric transducer arranged at a scanning section for the star image to be formed by the optical system, and a signal processor for generating detection data on the star image in accordance with a signal output from the photoelectric transducer. The optical detector fo the photoelectric transducer has semiconductor photosensitive elements arranged at the scanning section for the star image to be formed, and reticles, arranged between the semiconductor photosensitive elements and the optical system, to constitute a plurality of photosensitive sections and light-blocking sections on the photosensitive surface ofthe semiconductor photosensitive elements along a star image-scanning direction. The signal processor has means for generating detection data on the star image in accordance with the signal output of the semiconductor photosensitive elements.

4 Claims, 12 Drawing Figures

STAR SCANNER WITH SEMICONDUCTOR PHOTOSENSITIVE ELEMENTS HAVING RETICLES

BACKGROUND OF THE INVENTION

The present invention relates to a star scanner used for detecting the attitude of a space vehicle that is in a spinning motion in space.

As shown in FIG. 1, a conventional star scanner installed in a space vehicle comprises optical system 11 for forming an image of a star, a photoelectric transducer consisting of light-blocking plate 12 having a V-shaped (or N-shaped) slit pattern formed therein, and photomultiplier tube 13 located behind plate 12, and signal processor 14 for fetching the star image detection data from a signal output from photomultiplier 13. More particularly, as shown in FIG. 2A, a star image formed by optical system 11 is moved by the spinning of the vehicle and crosses slits A1 and A2 of plate 12. In this case, the light passing through slits A1 and A2 is detected by photomultiplier 13 and is transduced as a pulse signal having amplitude is corresponding to its intensity, as shown in FIG. 2B. Since slits A1 and A2 constitute a letter V (or N), two pulses (three pulses in the case of an N-shaped slit pattern) per star image are generated by photomultiplier 13. Pulse separation T of these pulses is determined in accordance with the positions at which the star image crosses slits A1 and A2, i.e., the incident angle (angle of elevation) of the input light. Therefore, when amplitude Is and pulse separation T of the output pulses from photomultiplier 13 are measured by signal processor 14, the star can be identified and attitude of the vehicle can be determined.

However, the conventional star scanner uses a photomultiplier tube as an optical detector for its photoelectric transducer. Since the photomultiplier tube is a vacuum tube, it requires a high-voltage power supply of 1 to 2 kV, which leads to an increase in power consumption. In addition, since a photomultiplier tube is bulky and heavy, and has poor reliability, it poses many problems when it is installed on a satellite, whose maintenance is difficult to perform.

In contrast to this, another conventional star scanner uses, as an optical detector, a bar-type semiconductor photosensive element such as a photodiode. For example, two photodiodes are arranged to constitute a letter V (or N), in order to provide a small, lightweight, low-power optical detector. However, such a photodiode has a lower sensitivity than that of a photomultiplier tube and tends to be easily influenced by noise. Particularly, a 1/f noise component of the photodiode has a power spectrum as shown in FIG. 3. As seen from FIG. 3, the 1/f noise component is very large in the low-frequency band and is a major factor causing noise. For example, when a star image passes the photosensitive surface of the photodiode, the output current signal of the photodiode changes, as shown in FIG. 4. The power spectrum with respect to the frequency is as shown in FIG. 5 and major components thereof are concentrated in the low-frequency band. In this manner, in a conventional star scanner which uses a semiconductor photosensitive element, such as a photodiode, as an optical detector, the influence of the 1/f noise component is large, and only a star brighter than that of first magnitude can be detected.

SUMMARY OF THE INVENTION

It is an object of the present invention to provide a small, lightweight, low-power star scanner which uses a semiconductor photosensitive element such as a photodiode as an optical detector, which is less influenced by a 1/f noise component, which has a good S/N ratio. Equivalently the star scanner has a good sensitivity.

According to an aspect of the present invention, there is provided a star scanner comprising an optical system for forming a star image, a pair of semiconductor photosensitive elements constituting a letter V provided at a scanning section for the star image formed by said optical system, reticles, arranged between said optical system and each of said semiconducor photosensitive elements, for constituting a plurality of photosensitive sections and light-blocking sections on a photosensitive surface of each of said photosensitive elements along a star image scanning direction, and a signal processing section for generating detection data on the star image in accordance with an output signal from each of said semiconductor photosensitive elements.

BRIEF DESCRIPTION OF THE DRAWINGS

FIGS. 6, 7, 8, 9, 10, 11 are views for explaining a star scanner according to an embodiment of the present invention, in which FIG. 6 is a block diagram showing an overall arrangement, FIG. 7 shows an arrangement of a photoelectric transducer, FIG. 8 is a block circuit diagram showing a practical arrangement of a signal processor, FIG. 9 is a waveform chart showing a waveform of the output current from the photoelectric transducer, FIG. 10 is a graph of an example of the power spectrum characteristics, and FIG. 11 is a graph showing the relationship between the spin rate and the S/N ratio.

DETAILED DESCRIPTION OF THE PREFERRED EMBODIMENT

An embodiment of the present invention will now be described in detail with reference to FIGS. 6 to 11.

Figure 1:
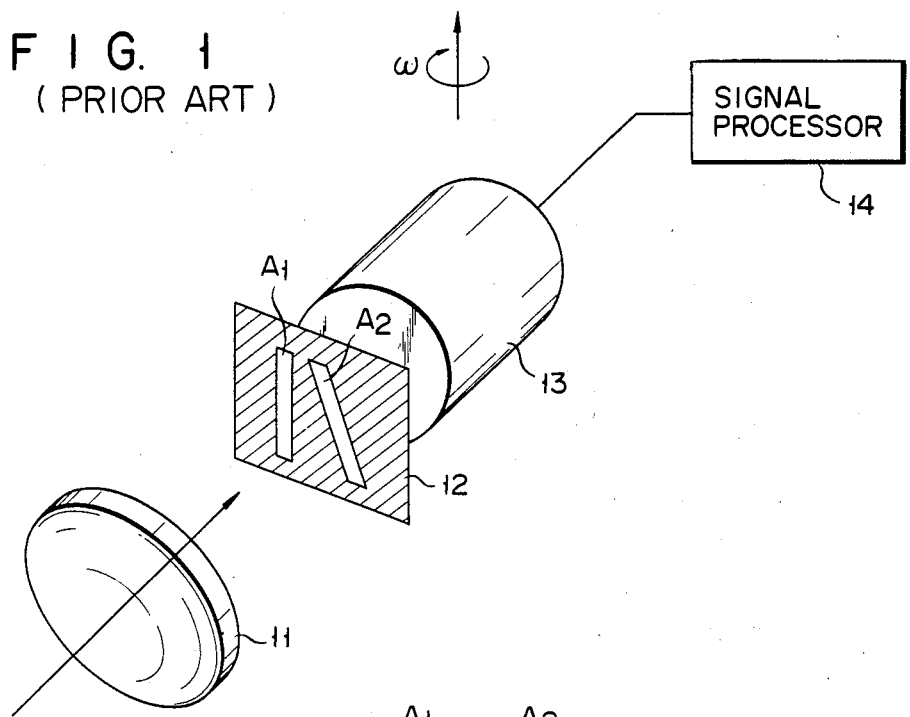
FIG. 1 is a block diagram of a conventional star scanner.
Figure 2A:
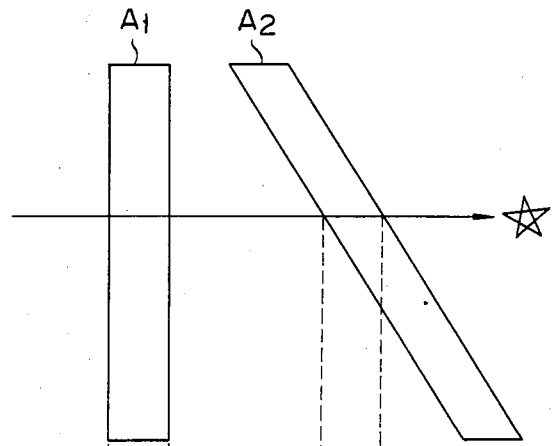
FIGS. 2, 3, 4, 5 are, respectively, views for explaining the operation of the conventional star scanner.
Figure 2B:
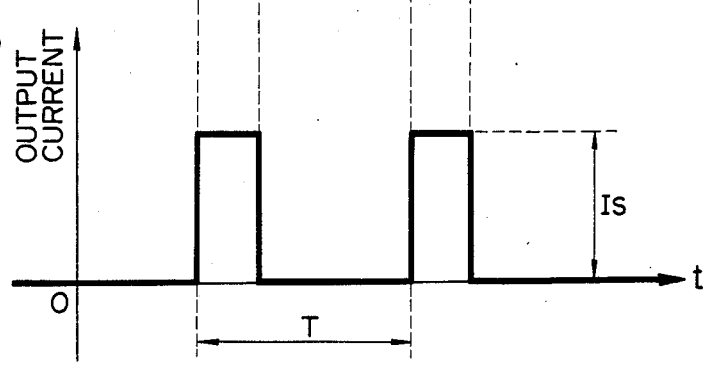
Figure 3:
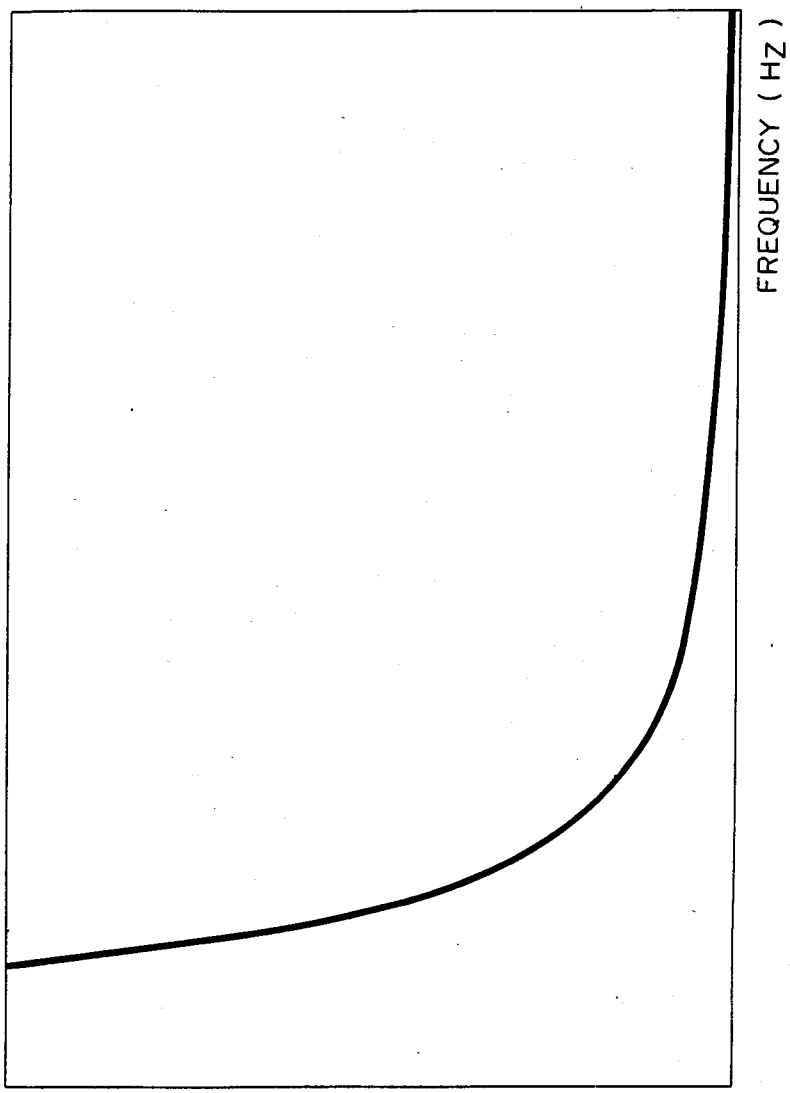
Figure 4:
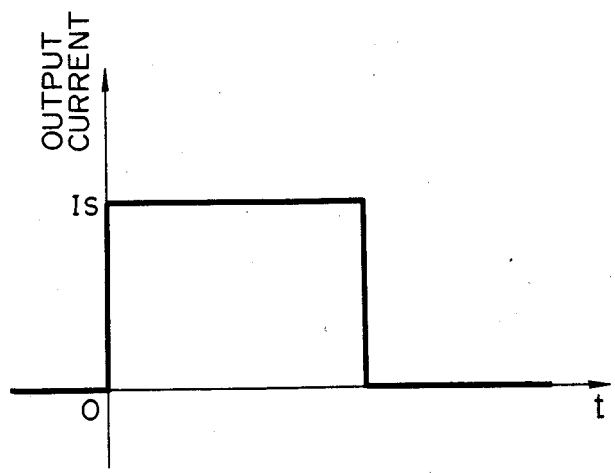
Figure 5:
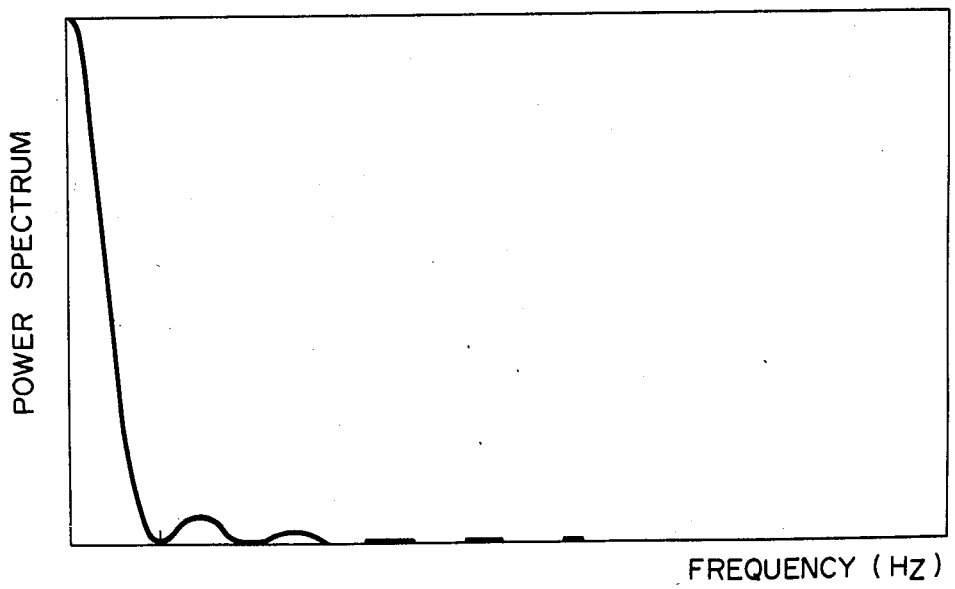
Figure 6:
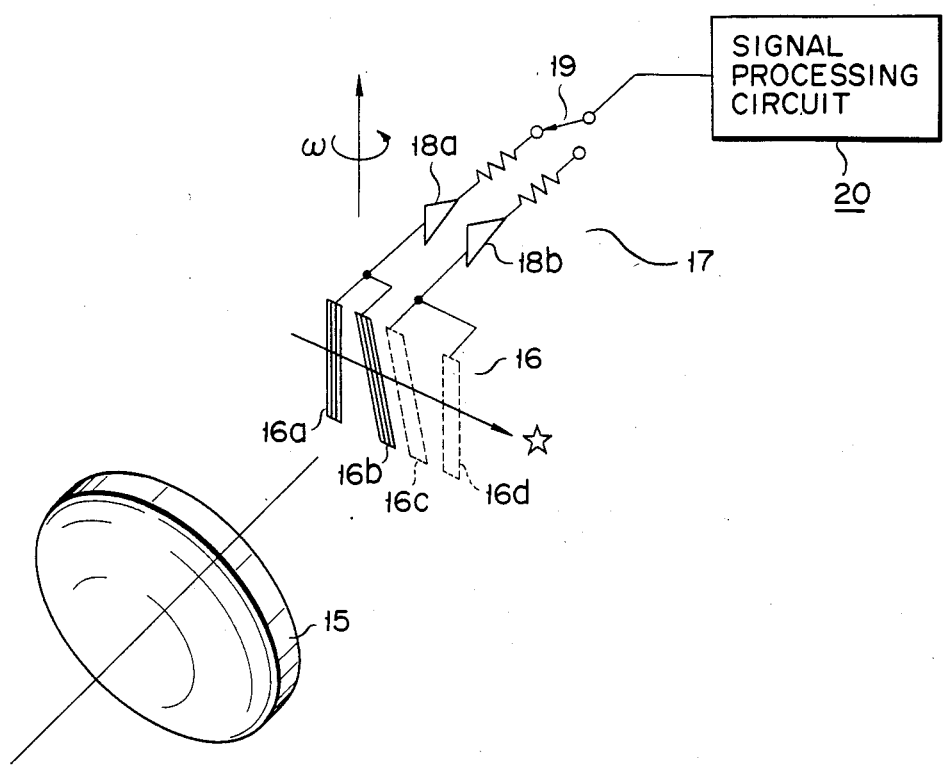

FIG. 6 shows the overall arrangement of the embodiment of the present invention. More specifically, the star scanner of this embodiment comprises optical system 15 for forming a star image, photoelectric transducer 16 for photoelectric conversion of the light of the star image formed by optical system 15, and signal processor 17 for generating detection data of the formed star image based on the output signal of photoelectric transducer 16.

Figure 7:
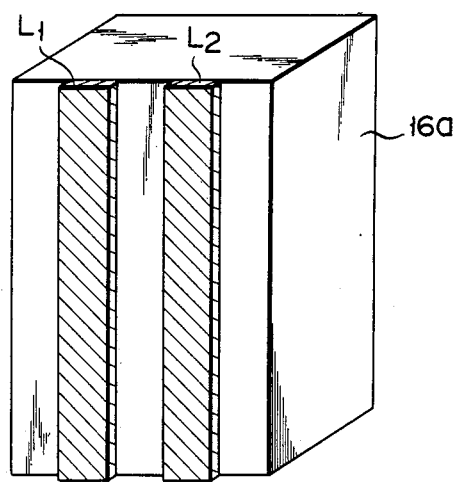

Photoelectric transducer 16 uses four photodiodes (semiconductor photosensitive elements) 16a to 16d which are separated into two systems each constituting a letter V in the direction along which the star image formed by optical system 15 is scanned. A plurality of (two, in this case) reticles L1 and L2 are formed in direct contact with the photosensitive surface of each of photodiodes 16a to 16d along the longitudinal direction, so that a plurality of photosensitive sections and light-blocking sections are aligned at the same pitch in the star image scanning direction, as shown in FIG. 7.

Signal processor 17 consists of amplifier 18 for amplifying the outputs from the two systems of photoelectric transducer 16, switch 19 for selective output of an arbitrary output of the two systems of amplifier 18, and signal processing circuit 20 for receiving the signal output from switch 19 and for generating detection data on the star image.

Figure 8:
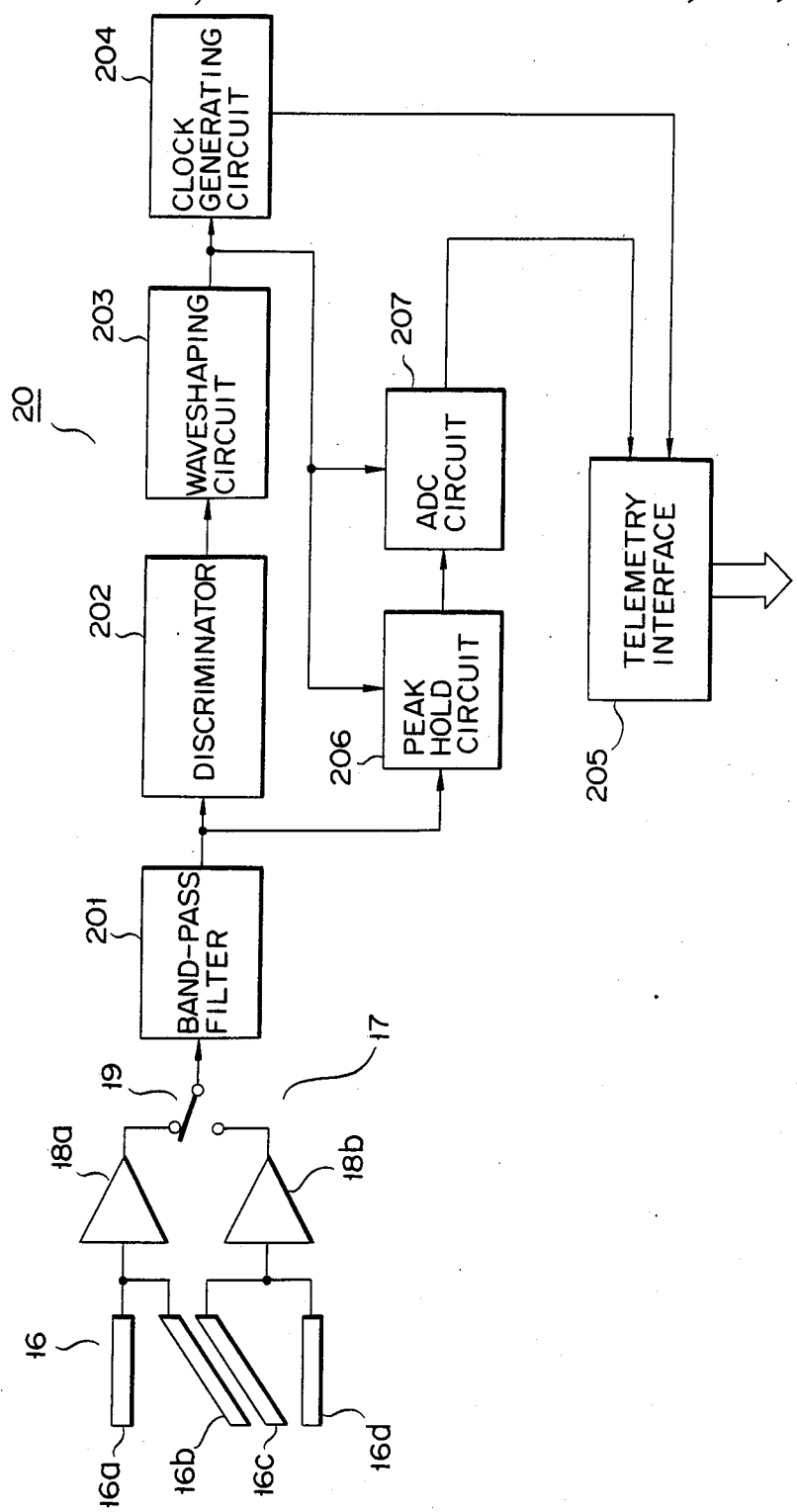

FIG. 8 is a block circuit diagram of the practical arrangement of signal processor 17. The signals obtained by photodiodes 16a to 16d of photoelectric transducer 16 are grouped in accordance with the systems, amplified by preamplifiers 18a and 18b of amplifier 18, and selectively supplied to signal processing circuit 20 by switch 19. In circuit 20, only a frequency signal of a predetermined band is derived from the input signal, by band-pass filter 201. The frequency signal is converted into a pulse train signal by discriminator 202 and is shaped to a single pulse signal by waveshaping circuit 203. The trailing time of the pulse signal output from circuit 203 is detected by clock-generating circuit 204 and is fed to telemetry interface 205, as detection time data of the star image. Peak-hold circuit 206 detects the peak value of the frequency signal derived by filter 201 during the pulse output period of circuit 203. The peak value is converted to a digital signal by analog/digital conversion (ADC) circuit 207 and is fed to interface 205, as amplitude data. The time data and the amplitude data input to interface 205 are paired and sent to an attitude control circuit (not shown) or the like, of the vehicle.

The operation of the above arrangement will now be described with reference to FIGS. 9 to 11.

When a star image formed by optical system 15 crosses single photodiode 16a, light to photodiode 16a is blocked by reticles L1 and L2. As a result, output signal I(t) from photodiode 16a changes in a pulse-like manner, as shown in FIG. 9. Reference symbol Is in FIG. 9 denotes the amplitude of the output signal from photodiode 16a, which is generally expressed as:

$$\text{Is} = \beta \int S(\lambda) \cdot R(\lambda) d\lambda \tag{1}$$

where $\beta$ is the efficiency of optical system 15, $S(\lambda)$ is the illuminance spectrum of the star, and $R(\lambda)$ is the sensitivity of photodiode 16a. For example, when diameter D of optical system 15 is 6 [cm], the stellar magnitude of a star is mv, $\lambda = 0.4$ to $1[$ $\mu$m], $\beta = 0.75, S(\lambda) = 1.68 \times 10^{-12} \times 2.512^{-mv} [W/cm^2]$, and $R(\lambda) = 0.3 [W/cm^2]$, $$\text{Is} = 1.07 \times 10^{-11} \times 2.512^{-mv} [A] \tag{2}$$

Figure 9:
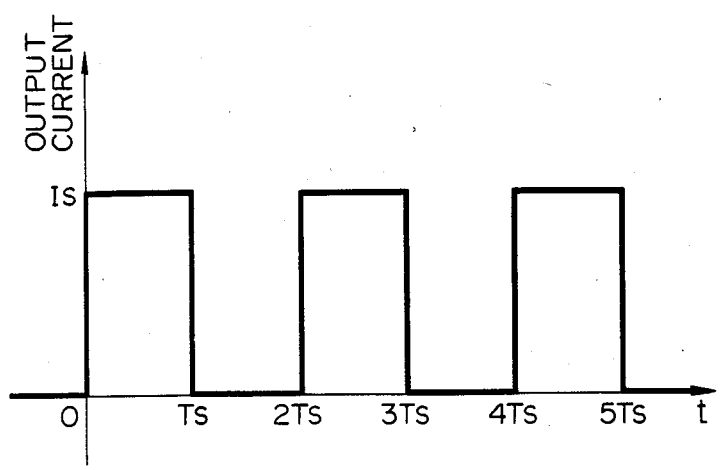

In FIG. 9, reference symbol Ts denotes a pulse width. Pulse width Ts is expressed as:

$$\text{Ts} = \{60 / (2\pi \cdot \text{Rs})\} \tan^{-}(d/fd) [\text{sec}] \tag{3}$$

where Rs [rpm] is the spin rate of the vehicle, d is the distance between reticles L1 and L2, and fd is the focal length of optical system 15. For example, when $Rs = 20$ [rpm], $d = 35[\mu m]$, and $fd = 6$[cm], $Ts = 0.28$[msec] is obtained. Therefore, the waveform of output current signal I(t) is expressed as:

$$I(t) = Is, (0 \le t \le Ts, 2Ts \le t < 3Ts, 4Ts \le \tag{4}$$

$$t < 5Ts) \ 0, (t < 0, Ts \le t \le 2Ts, 3Ts \le$$

$$t < 4Ts, 5Ts \le t)$$

The power spectrum of signal I(t) is expressed as:

$$F(\omega) = \int_{-\infty}^{\infty} I(t)^2 \cdot e^{-j\omega t} dt \tag{5}$$

$$= (Is^2/j\omega)\{(1 - e^{-6j\omega Ts})/(1 + e^{-j\omega Ts})\}$$

$$= Is^2\{\sin 3\omega Ts/\omega \cos(\omega Ts/2)\} e^{-5/2 \cdot j\omega Ts}$$

Figure 10:
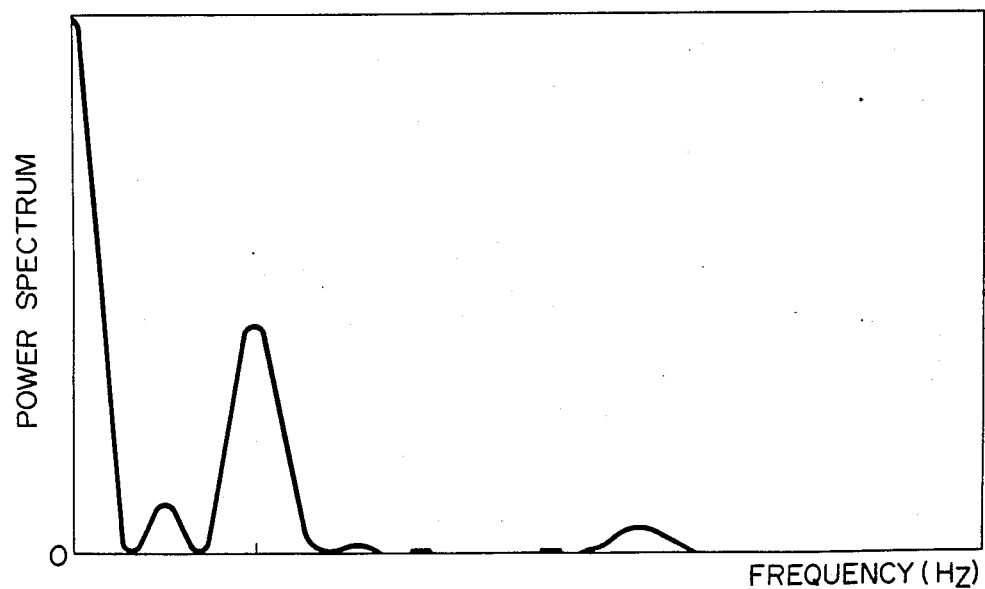
Figure 11:
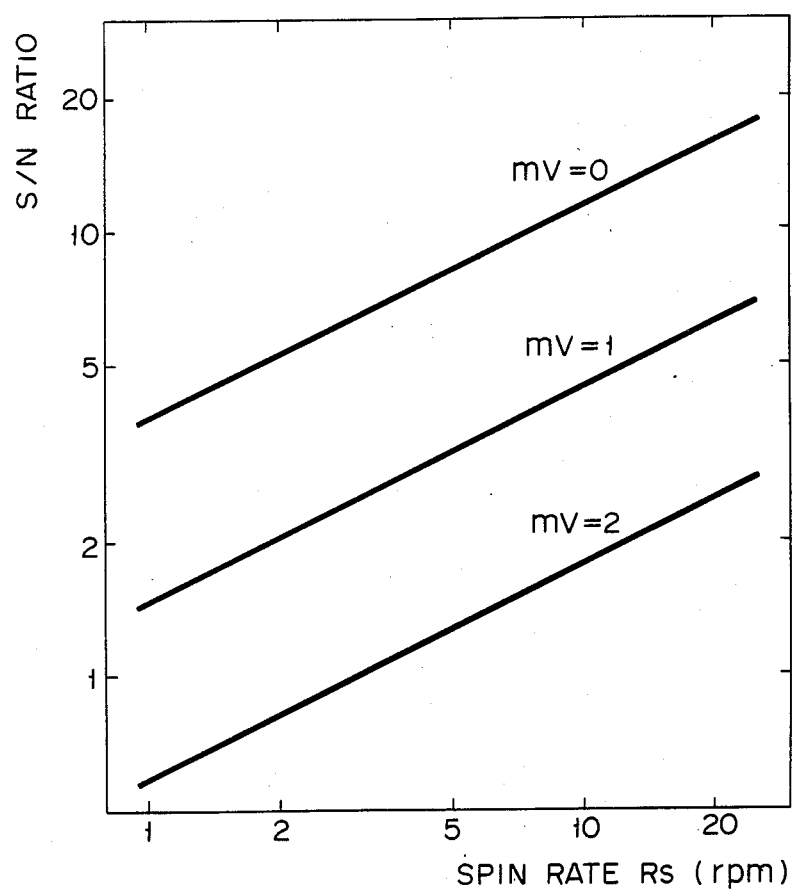

The absolute value characteristics of the power spectrum when Is=1 are shown in FIG. 10 as an example. As is apparent from FIG. 10, the typical frequency of signal I(t) becomes ½Ts [Hz] by means reticles L1 and L2 provided on photodiode 16a, and the major components of signal I(t) are concentrated around this frequency. In this case, the basic frequency can be maximized when the distances between the photosensitive sections and the light-blocking sections of photodiode 16a are set equal. Meanwhile, the 1/f noise component in the vicinity of this frequency is quite small when compared to the fundamental frequency component.

When only the component in the vicinity of the frequency component is derived from output signal I(t) of each of photodiodes 16a to 16d by filter 201, a better S/N ratio than with a conventional star scanner which does not use any reticle, can be obtained.

For example, when an ideal band-pass filter having a central frequency of ½Ts and a band width of 1/6Ts is used, and when the power spectrum of the noise component is K/f² where $K = 1.41 \times 10^{-23}$, the S/N ratio after passing through filter 201 is expressed as:

$$S/N = 15.9 \times 2.512^{-mv} \tag{6}$$

Meanwhile, when a star scanner without reticles is used, the S/N ratio is expressed as:

$$S/N = 2.85 \times 2.512^{-mv} \tag{7}$$

From equations (6) and (7), when a star scanner with reticles is used, the S/N ratio is about 5.6 times that of the star scanner without reticles, and a star of about third magnitude can be detected. FIG. 11 shows the relationship between the spin rate and the S/N ratio of this case.

As described above, in the star scanner using a photodiode as an optical detector being provided with reticles, a good S/N ratio can be obtained since the adverse influence of the 1/f noise component, as a conventional problem, is small. In this manner, a small, lightweight, low-power star scanner having a high sensitivity can be obtained.

The present invention is not limited to the above embodiment. The number, width, and interval of the reticles provided on the photodiode can be arbitrarily selected. In this case, when the widths of the photosensitive sections and the light-blocking sections of the photodiode constituted by the reticles are the same, the power spectrum of the fundamental frequency component becomes maximum. At this time, when the number of reticles per unit width is increased to increase the number of the light-receiving and light-blocking sections, the fundamental frequency of the signal is increased, resulting in a good S/N ratio. However, the 10 widths of the photosensitive and light-blocking sections must be determined in consideration of the size of the star image, depending on the chracteristics of the optical system. When the scanning width of the photodiode is increased to increase the number of reticles, the fundamental frequency component of the power spectrum is increased. In this case, however, the longer the width of the photodiode, the worse the precision of the angular resolution. The width of the photodiode and the width and the number of the reticles must be determined in consideration of the above conditions, so that an optimal design can be obtained.

Since the field of view of the star scanner is narrow, the reticles need not be arranged in direct contact with the photodiode, but can be spaced apart from the photodiode. The reticles need not be formed in separate groups, but can be formed in a slit-like manner. In the above embodiment, two signal detection systems (i.e. photodiode pair and preamplifire) are employed, for the purpose of redundancy. Moreover, another redundant signal detection system can be added for further increasing the reliability. The photodiodes to be used can be freely selected. The semiconductor photosensitive element is not limited to the photodiode but can be a photoconductor, phototransistor, a CCD, or the like.

What is claimed is:

1. A star scanner comprising:
an optical system for forming a star image;
a pair of semiconductor photosensitive elements constituting a letter V provided at a scanning section for the star image formed by said optical system;
reticles, arranged between said optical system and each of said semiconductor photosensitive elements, for constituting a plurality of photosensitive sections and light-blocking sections on a photosensitive surface of each of said photosensitive elements along a star image scanning direction; and
a signal processing section for generating detection data on the star image in accordance with an output signal from each of said semiconductor photosensitive elements.

2. A star scanner according to claim 1, wherein the widths of said photosensitive sections and said light-blocking sections formed on said photosensitive surface of each of said semiconductor photosensitive elements are determined in accordance with a size of the star image formed on said photosensitive surface.

3. A star scanner according to claim 1 or 2, wherein the widths of said photosensitive sections and said light-blocking sections formed on said photosensitive surface of each of said semiconductor photosensitive elements are the same.

4. A star scanner according to any one of claims 1 or 2, wherein said signal processing section derives a fundamental frequency component from the output signal of each of said semiconductor photosensitive elements and generates detection data on the star image in accordance with the fundamental frequency component.

* * * * *